Oct. 27, 1970    H. J. P. VON OHAIN ET AL    3,535,850
CENTRIFUGAL PARTICLE SEPARATOR
Filed Oct. 28, 1966    7 Sheets-Sheet 1

INVENTORS
HANS J. P. VON OHAIN
ROSCOE H. MILLS
BY
ATTORNEYS

Oct. 27, 1970  H. J. P. VON OHAIN ET AL  3,535,850
CENTRIFUGAL PARTICLE SEPARATOR
Filed Oct. 28, 1966  7 Sheets-Sheet 3

INVENTORS
HANS J.P. VON OHAIN
ROSCOE H. MILLS
BY Harry A. Herbert Jr.
Raymond J. Crowley and
ATTORNEYS Oct. 27, 1970   H. J. P. VON OHAIN ET AL   3,535,850
CENTRIFUGAL PARTICLE SEPARATOR
Filed Oct. 28, 1966   7 Sheets-Sheet 5

INVENTORS
HANS J.P. VON OHAIN
ROSCOE H. MILLS
BY Harry A. Herbert Jr.
Raymond J. Brawley
ATTORNEYS

Patented Oct. 27, 1970

3,535,850
CENTRIFUGAL PARTICLE SEPARATOR
Hans J. P. von Ohain and Roscoe H. Mills, Dayton, Ohio
Filed Oct. 28, 1966, Ser. No. 591,060
Int. Cl. B01d 45/12; B04c 5/06
U.S. Cl. 55—261                                    4 Claims

ABSTRACT OF THE DISCLOSURE

An apparatus comprising an elongated cylindrical housing forming a vortex chamber with means to admit contaminated air or gas into the chamber with a whirl or spin component to generate a natural vortex flow within the vortex chamber. Stationary wall means having a radial extension from the longitudinal axis of the housing serve to anchor the terminal ends of the spin axis of the vortex core to thereby stabilize the vortex flow and achieve a higher spin velocity in the vortex and a correspondingly higher particle separation efficiency.

---

The invention described herein may be manufactured and used by or for the United States Government for governmental purposes without payment to us of any royalty thereon.

This invention relates to improved devices for centrifugally separating dust or other suspended particles from gaseous streams such as air. In addition to wide commercial application, the invention is particularly adapted for use in supplying clean air for gas turbines adapted to drive tanks and helicopters. For employment of gas turbines to drive tanks and other heavy military vehicles it is necessary to employ recuperators to improve fuel economy and power output. The recuperators are heat exchangers in which exhaust gases from the turbine section transmit heat to the compressed air going from the compressor to the combustion section. The heat exchanger passages are small and at the high prevailing temperatures dust carried through the compressor tends to melt in the recuperator quickly clogging up the heat exchanger tubes. This problem would be very severe for operations in desert country. It is the aim of this invention to provide compact lightweight dust separating equipment which can clean all air entering gas turbine compressors so that all particles larger than the order of a micron will be separated without requiring a large pressure drop in the dust separating equipment.

When gas turbine driven helicopters are flown at low altitude in dusty air or over deserts, severe erosion of the light metal alloy compressor blading occurs but high efficiency lightweight dust separators have not been available to clean all air entering the gas turbine compressors.

The present invention relates to improvements in the well-known prior art cyclone dust separator which, in general, consists of an upright cylindrical housing with a closure for its upper end through which a clean air outlet conduit extends. At its lower end the cylindrical housing connects to an inwardly tapered conical section which, in turn, connects to a dust outlet conduit which is generally connected to a source of suction. Dust laden air enters the upper end of the cylindrical housing through a tangential conduit to impart a rotation to the inlet flow. The air forced under pressure through the tangential inlet conduit immediately forms a natural vortex in the cylindrical housing which acts as a vortex chamber. The flow spirals downward in the chamber with the velocity increasing toward the chamber axis while its static pressure falls. Theoretically, the velocity at the central axis could be infinite but actually the central core rotates as a whole. The spiral flow along the chamber wall loses energy and tends to turn radially inward and gradually reverses its direction and spirals upward in the core and passes out the overflow or clean air outlet. The dust particles are subject to an intense centrifugal force field and move radially outward to the vortex chamber walls. The dirt collected on the walls gravitates down into the conical section and passes out through the dust outlet conduit.

This equipment, while having no moving parts and simple, is subject to a number of disadvantages among which is the fact that the conical bottom of the vortex chamber brings dust into contact with the high velocity vortex core adjacent the central axis and a considerable amount of dust is re-entrained in the upward moving spiral flow and some passes into the clean air outlet conduit unless a relatively high suction is applied to the dust removal conduit. The high velocity vortex flow also contacts the conical section walls producing high fluid friction losses. Further, the clean air passing into the clean air duct contains a considerable rotational kinetic energy which is not recovered. Further instabilities arise in the vortex flow because there are no stationary wall portions transverse to the axis of the vortex chamber to which the ends of the spin axis of the vortex flow can anchor themselves and thereby limiting the rotational velocity which the core of the vortex can attain and the particle separation capability. Further lack of means for anchoring the spin axis of the vortex hinders the possibility of employing a pressure recovering diffuser of no value.

In accordance with the present invention, the dust or other contamination is allowed to collect in a radially extending annular passage at least partially surrounding the vortex chamber. The conical section of the prior art cyclone separator is eliminated and the spiral flow is turned inward without excessive friction and without carrying separated dust back into the vortex core flow. By the use of a diffuser expansion chamber, the flow conditions are such in the clean air outlet that the vortex flow is stabilized. This is because the diffuser or expansion chamber in each case has a radially extending wall which, cooperating with a wall or closure member at the opposite end of the vortex chamber, serves to anchor both ends of the axis of the core between rigid walls which allows extremely high spin velocities to be obtained in the core without entrainment of ambient pressure air contaminated with dust particles. The binding of the vortex core spin axis allows the vortex flow to follow the law of Hemholtz that the vorticity everywhere along the axis be constant, e.g., that the static pressure everywhere along the vortex spin axis is constant. If the spin axis of the vortex core were not anchored at its ends, the use of the diffuser would not be feasible since the flow would be altered by the functioning of the diffuser and its gain would be more than offset by deterioration in the flow upstream. The diffuser permits recovery of the rotational kinetic energy of the clean air discharge thus lowering the overall pressure drop across the separating equipment. Further, the scavenging air supply required for removing the dust or other contaminant is very modest, so that there is a considerable reduction in total flow requirements. Further features of the invention will become apparent by reference to the detailed description hereinafter given taken in conjunction with the appended drawings in which:

Figure 1:
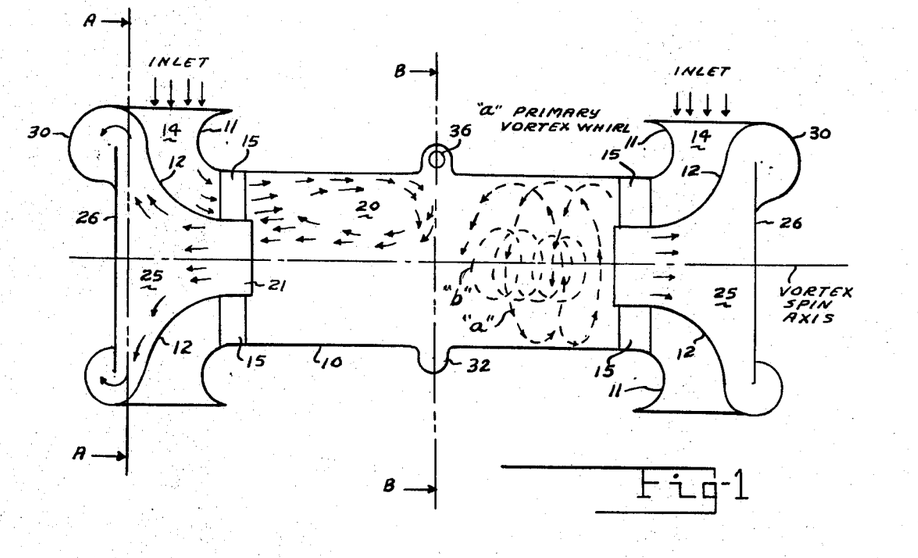
Fig. 1 is a longitudinal sectional view of basic structure in accordance with the invention.

Referring now to FIG. 1 of the drawings, therein is disclosed a basic form of a centrifugal separator in accordance with the invention. The reference numeral 10 indicates an elongated cylindrical metal casing, the interior of which forms a vortex chamber generally indicated by the numeral 20. At each end, the casing 10 is bell-mouthed, as indicated at 11, and which, cooperating with the spaced trumpet-shaped wall members 12, defines radial and axial in-flow passages 14. At their inner ends, the annular passages 14 terminate in a plurality of radially arranged circumferentially spaced inlet swirl vanes 15 at each end of the casing 10. The swirl vanes 15 impart a rotational component to the inflowing air or other gas stream at each end of the casing 10. The trumpet-shaped annular wall member 12 at each end of the casing 10 also provides for a central discharge passage 21, through which the air is guided into a diffuser formed by the expansion chamber 25 and defined by the walls 12 and 26. While the air passes through the diffuser 25, the kinetic energy of the tangential velocity component is converted at least in part into a rise in static pressure. The air leaves the diffuser 25 radially and enters the conventional spiral scroll-type diffuser 30 in which the air velocity is further decelerated and a further conversion of the rotational kinetic energy to static pressure is accomplished. The expansion chamber 25 and the scroll type diffuser 30 together form a diffuser assembly. The provision of the expansion chamber 25 with its shape permitting gradual radial expansion of the clean air flowing in from the vortex core and the provision of the wall 26 is very important. Vortex flows are extremely sensitive to the perturbations in pressure or the like in the vortex core and the provision of the walls 26 serve to contact and to anchor each end of the longitudinal spin axis of the vortex prevents flow instability as previously noted. With flow instability, large energy losses may occur and the vortex flow adjacent the chamber walls may turn inward prematurely so that poor centrifugal separation of finer particles is achieved and these particles become entrained in the clean air outflow. The anchoring of the vortex axis permits the diffuser to become effective without deleterious effects on the vortex flow.

Figure 1A:
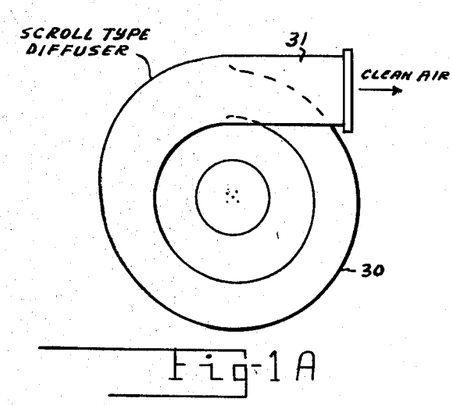
FIG. 1A is a view taken on line A—A of FIG. 1.
Figure 1B:
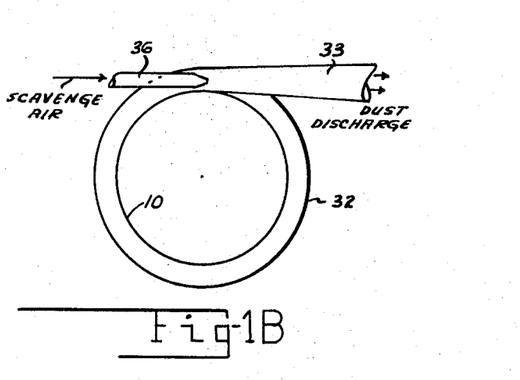
FIG. 1B is a view taken on line B—B of FIG. 1.

The cylindrical casing 10 is provided, at its vertical center line, or plane of symmetry, indicated by section line B—B, FIG. 1, with an annular radially extending dust collector groove 32. The diffuser scrolls 30 at each end of the centrifugal separator of FIG. 1, as seen in FIG. 1A, connect to a clean air discharge conduit 31. As seen in FIG. 1B, the central dust collecting channel 32 communicates with a tapered laterally extending discharge conduit 33 cooperating with an aspirator nozzle 36, whereby scavenging air under pressure delivered by the nozzle into the dust discharge duct 33 effectively withdraws highly dust-laden air from the channel 32 and discharges the separated dust to the atmosphere or to a suitable collection container (not shown).

The device disclosed in FIGS. 1, 1A and 1B operates in the following manner. It will be assumed that the conduit 31, forming the outlet of the scroll-type diffusers 30, shown in FIG. 1A, will each be connected to an apparatus, for example a plenum chamber, forming the inlet of a gas turbine whereby, upon starting the gas turbine, the compressor thereof will cause a reduced pressure in the conduits 31 and clean air diffuser scrolls 30, which will communicate a reduced pressure to the chambers 25 and 20 and to the radial air inlets 14 at each end of the casing 10. Dust-laden air under atmospheric pressure will, accordingly, flow radially inward through the curved annular inlets 14 at each end of the casing 10, and will be turned into an axial direction when flowing into contact with the radial inlet swirl vanes 15 at each end of the casing 10. The swirl vanes 15 will impart a rotational or swirl component to the air flowing through the swirl vanes 15 into the vortex chamber 20 formed by the interior of the cylindrical casing 10. The contaminated air flowing into the vortex chamber 20 at each end thereof will initiate a so-called vortex or cyclone flow in which the rotational velocity along the longitudinal axis of the chamber 20 will be very high and the static pressure low, while radially outward the vortex velocity will be lowered and the static pressure higher. The primary vortex swirl is indicated by $a$ at the right hand of FIG. 1, and the central core rotation is indicated by $b$. While the airflow in the vortex in general will follow the natural phenomena of a vortex, dust entrained in the incoming air stream will be subjected to a high centrifugal force field which will cause the dust particles to wander radially outward toward the walls of the casing 10. While the air stream is rotating in a vortex, as indicated at the right-hand end of FIG. 2, the inflowing air also has a meridian component of flow, as indicated by the arrows at the left-hand end of FIG. 1. It will be seen that the air flow, after passing through the swirl vanes 15, tends to crowd radially outward as the flow moves axially in the chamber 20. As the flow tends to approach the vertical axis of symmetry of the device, the energy of the flow decreases, and it tends to have a meridian component which turns radially inward, and the axial flow at the core is then reversed in direction, as indicated by the arrows, and moves axially toward the ends of the vortex chamber 20; thereby, a reversed secondary flow pattern is generated. The clear air core finally exits through the outlet openings 21. The flow entering the outlets 21 will contain a very considerable amount of energy by virtue of the rotational component of the flow, and this rotational component, in part, is removed by means of the radial expansion chamber or diffuser 25, which directs the flow radially outward and into the conventional scroll-type diffuser 30, wherein the velocity energy of the discharge air is further converted to pressure. The advantages in stabilizing the vortex flow by use of the expansion chamber 25 end wall or baffle member 26 to anchor the inner end of the longitudinal axis of the vortex flow thus permitting the use of a diffuser without disruption upstream of the vortex flow have been previously described. By utilizing diffuser apparatus for converting the rotational energy of the clean air discharge to pressure, the total pressure drop in the separator is greatly reduced over that of a conventional cyclone dust separator of an equal flow capacity.

Figure 2:
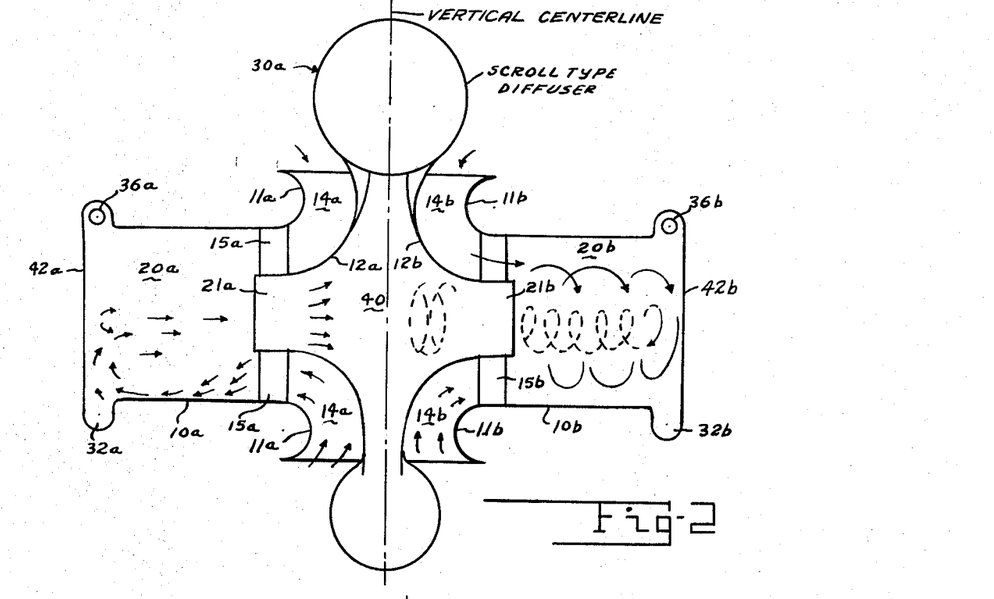
FIG. 2 is a sectional view similar to FIG. 1 illustrating a modified arrangement of the basic components thereof.

Because of the high centrifugal force field present in the vortex chamber 20 formed by the casing 10 in the device of FIG. 2, the dust and dirt entrained in the air is forced radially outward toward the walls and is carried by the meridian flow component axially from each end of the chamber 20 toward the vertical center line. Because of the centrifugal force, the dust tends to collect in the annular chamber 32 and there is very little tendency for any dust to be re-entrained into the meridian flow from each end of the casing 10. Because of the intense vortex velocity in the core flow, indicated by $b$, little or no dust is carried as the air stream reverses its direction at the core and moves axially toward each of the openings 21. The concentration of dust increases as the meridian flow moves along the chamber wall toward the radial chamber 32 at the vertical axis of symmetry of the device of FIG. 1. Scavenging air under relatively low pressure is admitted to the nozzle 36, as indicated in FIG. 1B, so that, by aspirator action, air strongly contaminated by dust is continuously removed from the equipment via the conduit 33. Instead of the aspirator action produced by the nozzle 36, a conventional external ejector or suction pump, not shown in the figures, can be employed.

The device of FIG. 1 is primarily distinguished over the well-known prior art cyclone air cleaner, previously discussed, in that it will be noted that, in the device of FIG. 1, there is no arrangement corresponding to the conical section of the prior art cyclone, and that the dust is removed into the duct 32 in FIG. 1, at a point radially outward of the vortex where the static pressure is high and the rotational flow velocity is low. By removing the dust in the annular chamber 32, there is little opportunity for the dust to become re-entrained in the reverse flow occurring at the core toward each end of the vortex chamber and, accordingly, the device of FIG. 1 can separate smaller particles and have a much higher cleaning efficiency than the prior art constructions. Utilization of means for anchoring the vortex spin axis in conjunction with the diffuser expansion chamber 25 as previously described stabilizes the vortex flow to remain concentric with the vortex chamber longitudinal axis thus avoiding large internal flow energy losses and greatly increasing particle separation or cleaning efficiency. Further, by providing the diffuser assembly comprising the diffuser chamber 25 and the scroll-type diffuser 30, a large part of the rotational kinetic energy of the vortex flow entering the diffuser chamber 25 is recovered in the form of static pressure and thus lowering the pressure drop across the device between the inlets 14 and the diffuser outlets 31. Furthermore, in the device of FIGS. 1 and 1B, the scavenging air required to remove the dust is only a small fraction of the flow losses encountered with the prior art cyclone separator.

FIG. 2 illustrates the centrifugal separator of the same general mode of operation as described above with respect to the device of FIG. 1. The device illustrated in FIG. 2 for the same flow requirements can be constructed more compactly and utilizes a more efficient dual entrance, single-outflow type radial diffuser for converting rotational energy of the clean air discharge into pressure. As seen in FIG. 2, the device disclosed therein is symmetrical around a vertical center line, and the parts thereof, common to the separator disclosed in FIG. 2, are indicated by the same reference numeral with the exception that the reference numeral subscript $a$ indicates the left-hand component and the subscript $b$ the right-hand component on the opposite side of the vertical plane of symmetry. The device of FIG. 2 includes a longitudinally extending cylindrical casing $10a$, $10b$, respectively, which, at their inner ends, are bell-mouthed, as indicated at $11a$ and $11b$, to cooperate with trumpet-shaped annular wall members $12a$ and $12b$, to define radially and axially extending annular inlet passages $14a$ and $14b$, respectively, communicating with the vortex chambers $20a$ and $20b$, respectively, formed by the interiors of the housing members $10a$ and $10b$. At the inward terminal ends of the annular inlet, passages $14a$ and $14b$ are radially extending swirl vanes $15a$ and $15b$, functioning as in the device of FIG. 1. Air entering the respective vortex chambers $20a$ and $20b$, with a swirl component forms a free vortex, as in the device of FIG. 1. The flow moves axially toward the respective end walls $42a$ and $42b$ where it turns inwardly toward the core, as indicated by the arrows in the left-hand portion of FIG. 2. At the core, the flow turns in a reversed axial direction toward the central clean air outlets $21a$ and $21b$. Annular grooves $32a$ and $32b$ at each end of the device of FIG. 2 correspond exactly in function to the annular chamber 32 of FIG. 1, and dust collected in these chambers is removed by means of scavenging nozzles $36a$ and $36b$ arranged in the same fashion as illustrated in FIG. 1B. Clean air entering the outlets $21a$ and $21b$ from the secondary vortex flow passes through the central diffuser chamber 40, serving the same function as the chamber 25 of FIG. 1, which, in turn, communicates with a large central scroll-type diffuser $30a$, of the same general character as the diffuser 30 of FIG. 1 and the out flow from the diffuser will be conducted through a conduit similar to the conduit 31 of the device of FIG. 1A. In the device of FIG. 2 the end walls $42a$ and $42b$ serve to anchor the opposite ends of the spin axis of the vortex flow to thereby stabilize the flow and permitting the use of the diffuser chamber 40 and the scroll-type diffuser $30a$ without affecting the vortex flow. While the device of FIG. 2 is considerably axially compressed over the equipment shown in FIG. 1, the general mode of operation is essentially the same.

The form of the invention disclosed in FIG. 2 described above has only one drawback over the more bulky form of the invention described in FIG. 1, and that resides in the fact that the meridian flow, as actually indicated in the left-hand portion of FIG. 2, eventually results in a radial inflow, which, in the high velocity core, reverses its axial direction and flows toward the central outlets $21a$ and $21b$. The flow in turning inward causes a contact of the high-speed rotational flow with the end walls $42a$ and $42b$ respectively. This contact causes a considerable reduction of rotational speed of the air by friction which, in turn, results in a thin layer of high-speed radial inward flow. This thin layer of high radial inward speed flow carries some separated dust back into the core. In order to overcome the difficulty associated with the dust re-entrainment on the end walls $42a$ and $42b$, the structure, as disclosed in FIG. 3 has been devised.

Figure 3:
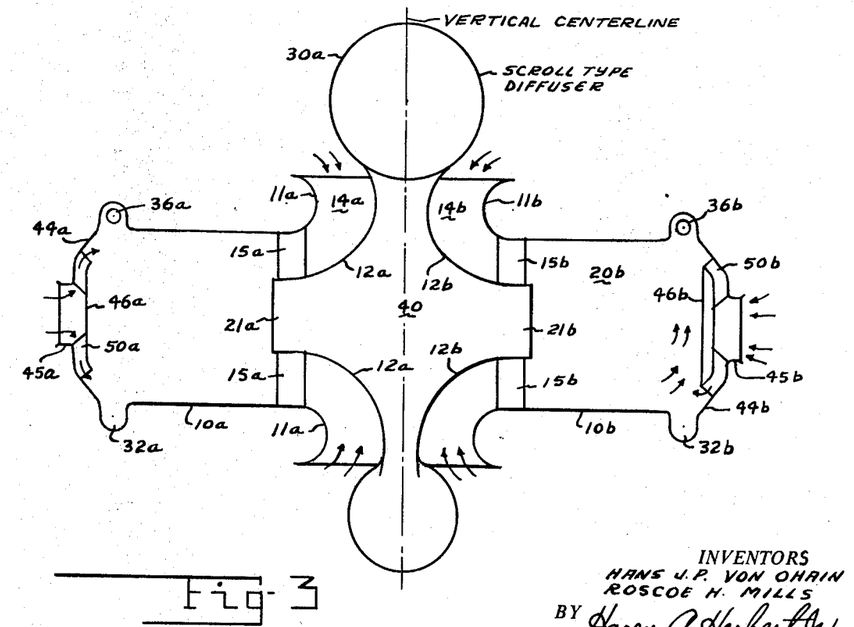
FIG. 3 is a view similar to FIG. 2 illustrating a means for eliminating end wall friction in the device of FIG. 2.

The device of FIG. 3 is identical in all respects to the device of FIG. 2, with the exception that the end walls $42a$ and $42b$ are replaced by an improved structure. It will be noted that the device of FIG. 3 is symmetrical about the vertical center line. It will be seen that the outer ends of each of cylindrical casings $10a$ and $10b$ are closed by an end wall $44a$ and $44b$ respectively. The end walls $44a$ and $44b$ are respectively pierced by central flanged apertures $45a$ and $45b$ respectively. Cylindrical baffle members $46a$ and $46b$ are spaced inward from the inlets $45a$ and $45b$ respectively and swirl vanes $50a$ and $50b$ extend radially in the space between the walls $44a$ and $46a$ and $44b$ and $46b$ in each case. When the equipment of FIG. 3 is placed in operation, air contaminated by dust will enter the chambers $20a$ and $20b$ through the annular curved inlets $14a$ and $14b$ respectively and, at the same time, the reduction in pressure which causes the air to enter through the inlets $14a$ and $14b$ will cause a secondary inlet flow of clean air to enter at each end through the inlets $45a$ and $45b$ respectively. This air, in flowing through the radially extending swirl vanes $50a$ and $50b$ will be given a rotational component of the same spin direction as imparted by the vanes $15a$ and $15b$ respectively when it enters the respective vortex chambers $20a$ and $20b$. The additional energy caused by the bleed inflow tends to turn the vortex meridian flow inward without high radial inward velocity components, thereby preventing dust re-entrainment into the core, which occurs in the device of FIG. 2. The baffle walls $46a$ and $46b$ forming part of the vortex chamber closure assemblies $44a$ and $44b$ respectively serve as the transverse wall members to anchor the ends of the spin axis of the vortex flow for the same purpose of stabilizing the vortex flow as in the devices of FIGS. 1 and 2.

Figure 4:
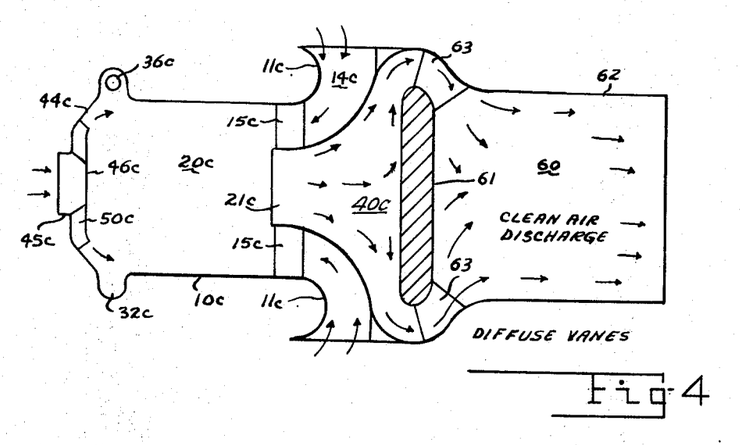
FIG. 4 is a sectional view of a device somewhat similar to FIG. 3 but which employs a vaned diffuser in the clean air outlet flow.

A form of the invention which has improved simplicity and compactness is illustrated in FIG. 4. This device corresponds in general to the embodiment of the invention disclosed in FIG. 3 to the left of a plane coinciding with the vertical center line and discarding the scroll-type diffuser $30a$ and all of the structure to the right of the vertical center line. There will then result a structure corresponding to the left-hand portion of FIG. 3, from the vertical plane of symmetry, with the corresponding parts indicated in FIG. 4 by the same reference numerals as in FIG. 3, with the exception of the addition of the subscript c. Air admitted to the curved annular inlet 14c flows through radial swirl vanes 15c into a vortex chamber 20c enclosed by a cylindrical housing 10c, as in the device of FIG. 3. Secondary air also flows in through the central inlet 45c and through the radial inlet swirl vanes 50c at the left end of the vortex chamber 20c in the same manner as the device of FIG. 3. Air in the central secondary vortex flow will enter by central inlet 21c into a corresponding diffuser chamber 40c. The chamber 40c, however, is partly closed by a baffle 61 which is supported from a discharge cylindrical conduit 62 by means of diffuser vanes 63 so that flow passing radially outward from the diffuser chamber 40c passes into the diffuser vanes 63, wherein the swirl component of the flow will be further removed and converted to pressure in the clean air discharge from the chamber 60, formed by the conduit 62. In the device of FIG. 4 the baffle member 46c and the baffle member 61 serve to respectively anchor the opposite ends of the spin axis of the vortex flow to stabilize the same in the manner previously described. The device of FIG. 4, with a slight modification, is eminently adapted to be arranged with other similar devices in a cluster assembly, as will hereinafter be more particularly described. It will be noted that dust collected at the left end of the vortex chamber 20c in the device of FIG. 4 passes into an annular dust collecting chamber 32c from which the dust is removed by aspirator action from a scavenging jet 36c in the same manner as employed in the device of FIGS. 1, 2 and 3, heretofore described.

Figure 5:
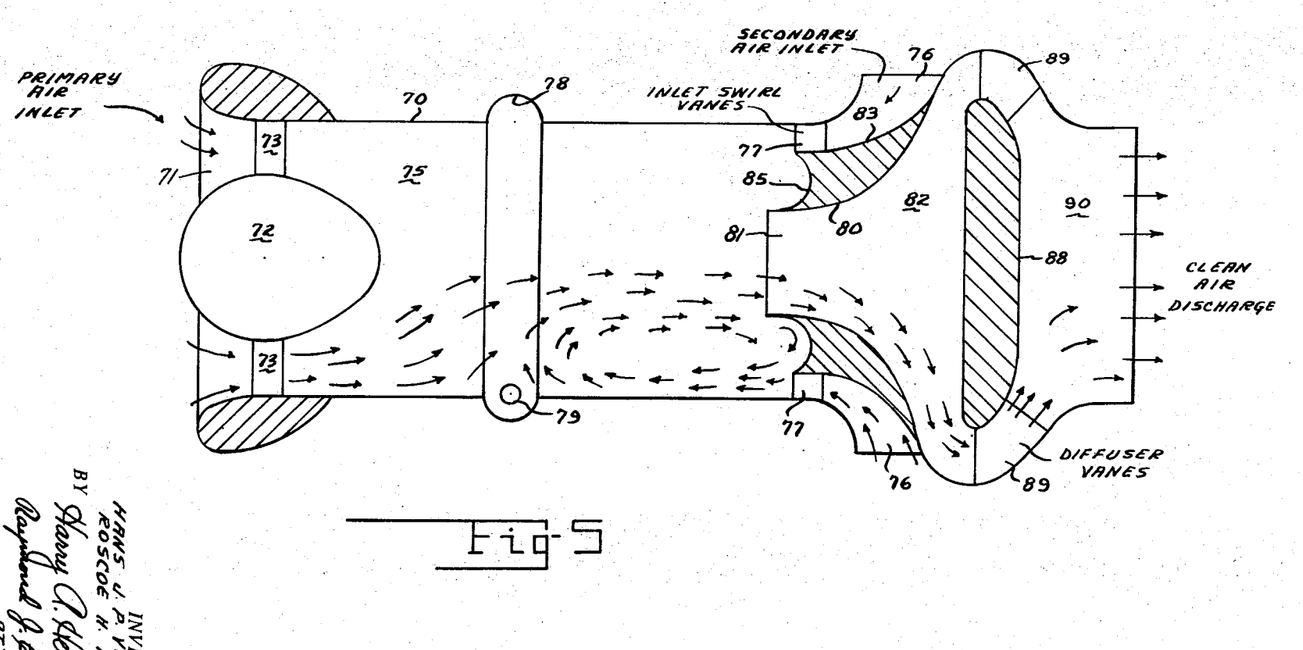
FIG. 5 illustrates in section a modified form of the invention in which there is an axial flow admission.

In the form of the invention of FIG. 5 a cylindrical metal casing 70 is provided at one end with a bell-mouthed inlet 71. A central streamlined support 72 serves to mount the inner ends of a plurality of radially extending inlet swirl vanes 73 connected at their outer ends to the inner wall of the casing 70. Air flowing through the swirl vanes 73 enters a vane-free vortex chamber 75 with a large rotational velocity component superimposed on the axial or meridian flow. A considerable distance downstream from the inlet 71, the casing wall 70 is deformed to provide a radially extending groove 78 to form a dust collection receptacle from which dust is removed with the aid of an ejector nozzle 79 in the same manner as in the previously described embodiments of the invention. At its downstream end the casing 70 is bell-mouthed so as to define with the spaced trumpet-shaped walls 83 a curved annular secondary air inlet 76 provided with secondary inlet swirl vanes 77. An annular trumpet-shaped wall 80 concentric with the longitudinal axis of the housing 70 provides a central inlet opening 81 for clean air discharge to enter a diffusion chamber 82. The chamber 82 is provided with an end wall 88 which serves to guide the clean air discharge radially into the diffuser vanes 89 from which the clean air is discharged into the cylindrical outlet chamber 90.

The spaced annular trumpet-shaped wall members 80 and 83 terminate in the vortex chamber 75 in a radially extending curved guide surface 85. The device of FIG. 5 operates in response to a pressure difference between the inlet 71 and the clean air discharge chamber 90 to cause dust-laden air to enter the axial inlet 71. The inlet airstream then passes through the inlet swirl vanes 73 where a rotation is induced into the axial flow. The airstream enters the vortex chamber 75 where, because of the free vortex created, the centrifugal force field will cause dirt particles to drift radially outward to the casing walls 70 and to be carried by the meridian flow component into the dust collection groove 78. The meridian flow components are illustrated in FIG. 5 by arrows and it will be noted that the secondary air flow admitted through the inlet 76 and swirl vanes 77 moves axially upstream along the wall of housing 70 and adding enery to the secondary inward circulating flow as indicated by the arrows. The secondary flow causes any dust recentrifuged by the vortex flow to move upstream and separate out in the dust collecting groove 78. The curved guide surface 85 greatly assists in guiding the inward directed meridian flow. In the device of FIG. 5 the rear portion of the streamlined body 72 and the radially extending baffle 88 in the diffuser assembly serve to anchor opposite ends of the vortex flow spin axis to function similar to the previously described forms of the invention. The expansion of the clean air into the diffusion chamber 82 and ultimate passage through the diffuser vanes 89 into chamber 90 is similar to the equivalent structure of FIG. 4.

Figure 5A:
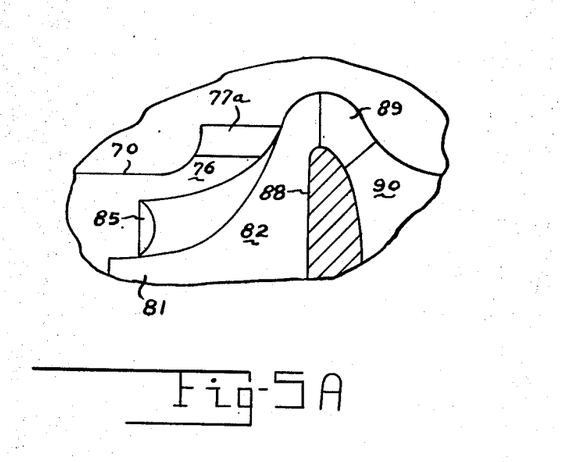
FIG. 5A is a fragmentary view of the device of FIG. 5 equipped with radial inflow swirl vanes.

Instead of employing axial secondary air inlet vanes 77 in the device of FIG. 5, radial swirl vanes 77a illustrated in fragmentary form in FIG. 5A may be employed and, if desired, may be made adjustable about their horizontal axes by conventional means (not shown).

Figure 6:
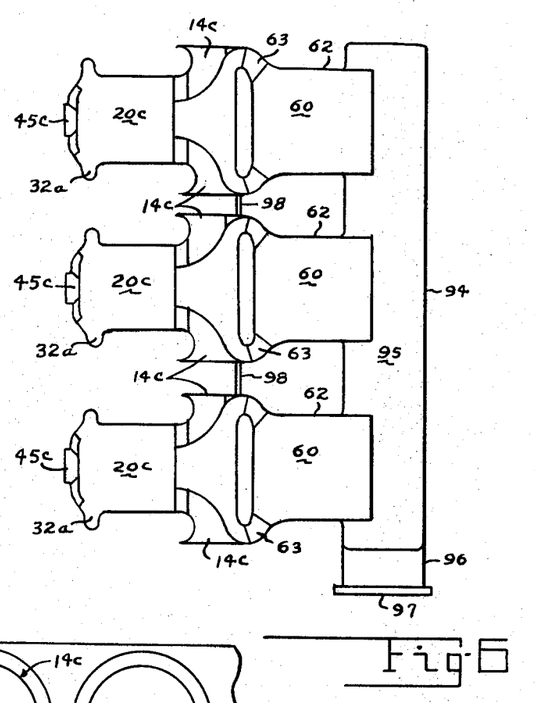
FIG. 6 is a side elevation in section illustrating a number of individual separators of the type of FIG. 4 arranged in a cluster for joint operation.
Figure 6A:
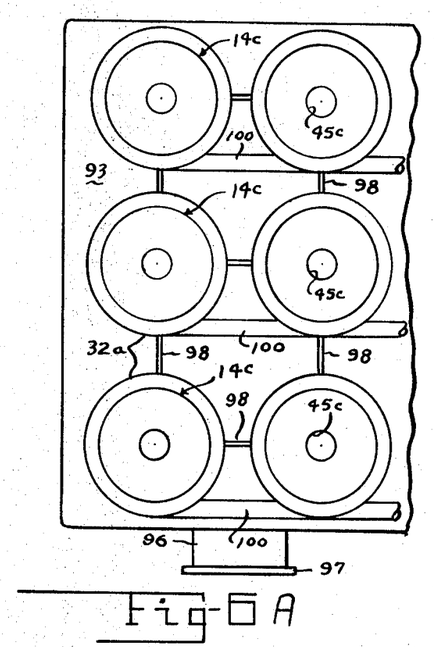
FIG. 6A is a front elevation of the cluster of FIG. 6.

It is well known that, under some conditions, advantages with respect to performance, compactness and weight can be obtained by employing a number of small separators combined in one unit rather than one single large separator. One such cluster arrangement utilizes cyclone separators of the type disclosed in FIG. 4 and the cluster arrangement is disclosed in FIGS. 6 and 6A, in which FIG. 6 is a side elevation section of the cluster assembly and FIG. 6A is a front view of the assembly of FIG. 6. As seen in FIG. 6, separator units illustrated in FIG. 4 are positioned, for example, three in number, in a vertical row and as many rows as desired. The respective elements of each of the separators are given the same reference numerals as in the device of FIG. 4. The individual discharge conduits 60, which can be greatly shortened for obtaining greatest compactness, are mounted into a suitable apertured wall 93 forming the front wall of a large plenum chamber, generally indicated at 95, having a rear wall 94 and suitably enclosed on its marginal edges. The plenum chamber 95 is provided with one or more outlet ducts 96 flanged, for example, as indicated at 97, for attachment to a device utilizing the clean air discharged from each of the separator conduits 60 into the plenum chamber 95. Each of the separators are bonded together by means of suitable rods or metal struts, such as 98, welded or otherwise secured to the casings of the separators and the discharge conduits 60 may be welded or otherwise secured to the front wall 93 of the plenum chamber 95. As seen in FIGS. 6 and 6A, the main air inlets 14c are radial and the auxiliary inlets 45c are all facing forward so that the dust-laden air which is to be cleaned has access to the inlets of the respective separators. In some cases (not shown in the figures) one may enclose the individual separators in a housing with a large front or side opening, and employ screens for preventing large particles to enter the cyclone separators and/or to produce uniform flow conditions for the air entering the separator system. The respective dust-collecting annular components 32a of the individual cyclone separators are adapted to be connected by means of a suitable conduit 100 with two or more separators connected to each conduit. Each conduit may, if desired, be provided with a scavenging air aspirating nozzle, such as 36c of FIG. 4, or the respective conduits 100 may be connected in parallel to a suitable suction source for withdrawing dust collected from the system.

Figure 6B:
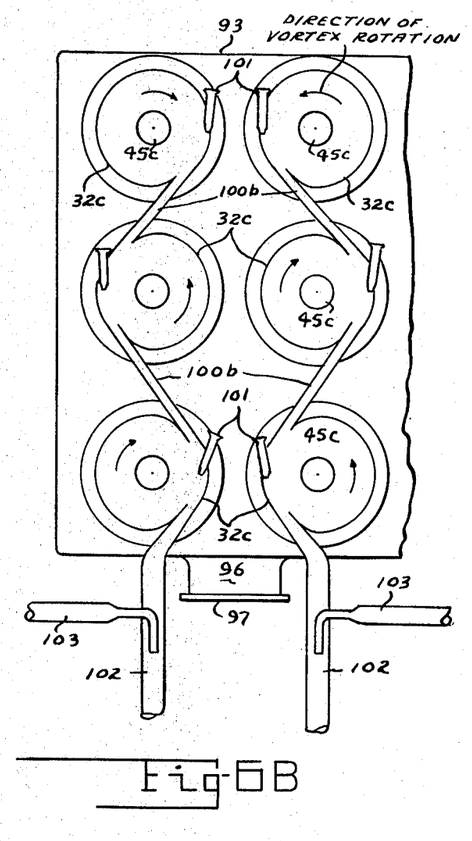
FIG. 6B is the device of FIG. 6 with a modified dust scavenging system.

To simplify the dust collecting system in a clustered arrangement of the general type of FIGS. 6 and 6A, apparatus may be devised in the manner as illustrated in FIG. 6B. In this figure, the respective separator units are arranged in vertical rows in the same manner as in FIG. 6A, with the exception that alternating separators in a given row have the swirl vanes arranged to give a votex rotation in opposite direction, as indicated by the arrows in FIG. 6B. Each of the dust collection chambers 32c is provided with an inlet nozzle 101 to permit ambient air to enter the dust collection groove. All of the dust collection grooves in a given row are connected by means of conduit 100b and the final conduit being connected to a discharge conduit 102 and ejector nozzle 103 connected to a source of scavenging air (not shown) will produce a suction in the conduits 102 tending to remove the dust from the respective ring channels, and the admission of atmospheric air through the nozzles 101 will provide the necessary aspirator action. All of the dust removing conduits 102 may be ultimately connected in parallel to a single dust removing conduit, if so desired. The dust collection arrangement of FIG. 6B is preferred over that of FIG. 6A in that the aspirator nozzle 101 directs inlet air into the dust removing channel in a direction corresponding to the direction of rotation of the vortex flow and the ultimate plumbing is simplified over the device of FIG. 6A.

Figure 6C:
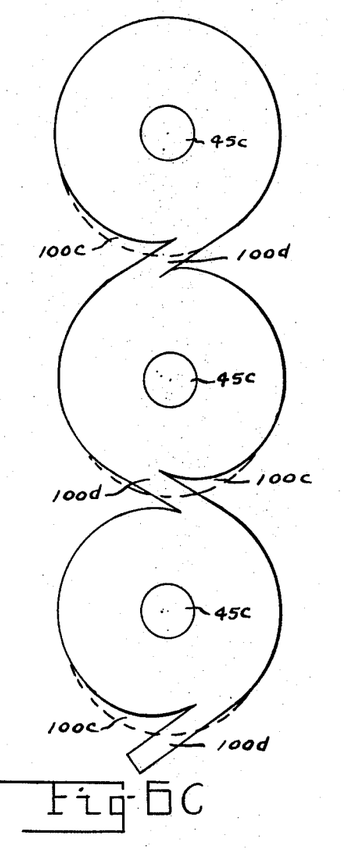
FIG. 6C is an arrangement of the device of FIG. 6 to gain added compactness.

In the modified form of the invention of FIGS. 6 and 6A, as illustrated in FIG. 6C, the ring channels 32a, previously employed for dust collection, degenerate into mere indentations indicated at 100c in FIG. 6C. Each of the swirl chamber dust collection grooves is brought into communication by means of passages 100d with the result that the assembly will be similar in action to the device of FIG. 6B except that greater compactness is insured and the plumbing is reduced to mere interconnected passages.

Figure 7:
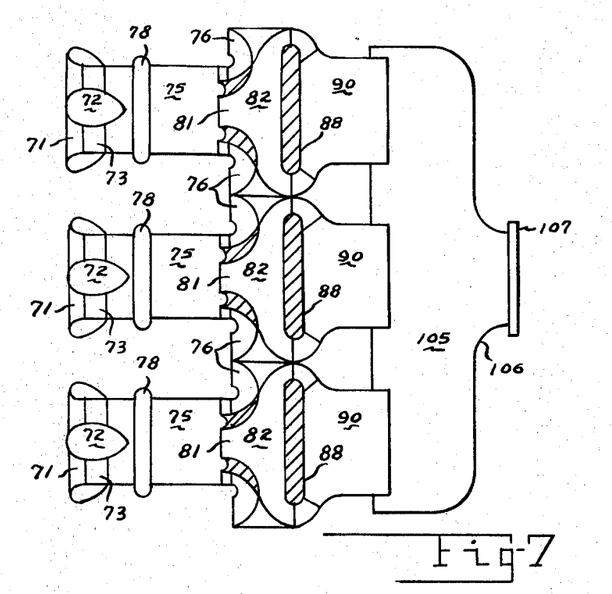
FIG. 7 is a side elevation in section of a cluster of cyclone separators of the type of FIG. 5.
Figure 7A:
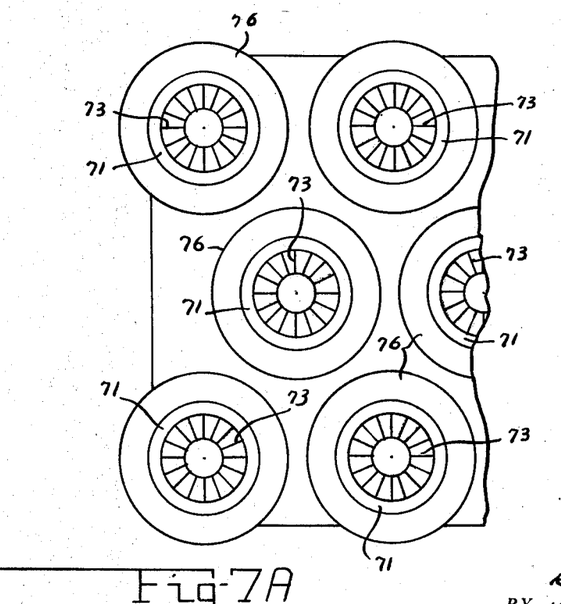
FIG. 7A is a front elevation of the device of FIG. 7.

A cluster arrangement utilizing the cyclone separator of the type disclosed in FIG. 5 is illustrated in FIGS. 7 and 7A. In this arrangement, the respective primary and second air inlets are arranged, as illustrated in FIG. 7, so as to be facing forward and the staggered arrangement of the individual separators to form a cluster, as illustrated in FIG. 7A. The device of FIG. 7 is similar to that of FIG. 6, having all of the clean air dust conduits 90 of the individual separator mounted on a front wall 103 of a plenum chamber 105 provided with one or more outlets 106, suitably flanged as at 107 for connection to a gas turbine compressor or other utilizing device, for withdrawing clean air from the plenum chamber. Reduced pressure in the plenum chamber causes atmospheric air to force dust-laden air into the primary inlets 71 and into the secondary vaned inlets 76. Dust can be removed from the dust collecting rings 78 in a manner similar to that previously described with respect to FIG. 6, but not illustrated in FIG. 7A for the sake of clarity.

We claim:

1. Apparatus for centrifugally separating suspended particles from a gas stream comprising a housing defining a horizontal cylindrical vane free vortex chamber open at each end, tubular spaced discharge conduits communicating with the vortex chamber at opposite ends thereof, the discharge conduits being concentric with the longitudinal axis of the vortex chamber, means defining an annular inlet passage at each end of said vortex chamber surrounding and concentric with said discharge conduits respectively, curved vanes positioned in each annular inlet passage means adapted to induce a whirl component into the contaminated gas flow passing through each of said annular inlet passage means into said vortex chamber and creating a vortex flow therein, the vortex flow proceeding from each end of said vortex chamber creating a centrifugal force field causing suspended particles to move radially outward to the vortex chamber wall and to be carried by longitudinal meridian flow toward the vertical plane of symmetry of the vortex chamber, means positioned substantially at the vertical plane of symmetry perpendicular to the longitudinal axis of the chamber at the wall of the vortex chamber for collecting and discharging particles centrifuged from the gas stream, the vortex flows from each of said inlets turning inward adjacent the said vertical plane of symmetry and forming vortex cores respectively moving upstream toward and through the respective discharge conduits, a pressure recovering diffuser positioned at each end of said vortex chamber housing, each diffuser having an expansion chamber of gradually increasing radial dimensions, the tubular discharge conduits at each end of the vortex chamber each directly communicating with the expansion chamber of a respective pressure recovering diffuser, each of said expansion chambers having a transverse end wall serving to anchor a respective end of the longitudinal spin axis of the vortex flow and a clean air discharge port leading directly from each diffuser.

2. Apparatus for centrifugally separating suspended particles from a gas stream comprising a tubular housing defining an elongated cylindrical vane free vortex chamber, spaced wall members forming a curved annular intake passage for a contaminated gas stream operatively connected to the tubular housing at its inner end, swirl vanes positioned at the exit of the intake passage to impart a rotation to the gas stream as it enters the tubular housing vortex chamber to initiate a vortex flow therein, a wall member forming a closure for the outer end of the tubular housing and having at least a portion thereof serving as an anchor for one end of the longitudinal spin axis of the vortex flow in the vortex chamber, a trumpet-shaped discharge conduit concentric with and surrounded by said curved annular intake passage, said discharge conduit having its inlet communicating with the vortex chamber in said tubular housing to permit flow from the vortex core to enter therein and to freely radially expand while moving downstream from the inlet, said discharge conduit forming an expansion chamber, a tubular clean air discharge conduit, means forming a tubular clean air discharge chamber, a radially extending baffle separating said expansion chamber and said clean air discharge chamber and serving as an anchor for the other end of the longitudinal spin axis of the vortex flow in the vortex chamber, wall means defining an annular curved passage extending radially around the baffle member and connecting the expansion chamber and the clean air discharge chamber, pressure recovering diffuser vanes positioned in said annular curved passage, said expansion chamber, said annular curved passage and said diffusion vanes together forming a diffuser for converting the rotational kinetic energy of the vortex flow admitted thereto to static pressure, a particle receiving channel positioned at the upstream end of the vortex chamber and adapted to receive the particles centrifuged from the vortex flow and carried longitudinally along the wall of the vortex chamber, a discharge connection from the said channel to the atmosphere, means for aspirating the collected particles from the channel into the discharge connection and means for admitting secondary air into the vortex chamber at its downstream end through a port in the closure member and directing the air with a whirl component radially outward to merge with the inturning vortex flow and form a boundary for the high velocity core of the vortex flow.

3. Apparatus for centifugally separating suspended particles from a gas stream comprising a cylindrical tubular housing defining a vane free vortex chamber open at its ends, guide means within said housing forming with said housing an annular primary inlet at one end for the gas stream to said vortex chamber, said guide means including swirl vanes in said inlet for inducing rotation into the gas stream flowing into the said vortex chamber and inducing a vortex flow therein and a body member behind the swirl vanes serving as a flow guide and as an anchor for one end of the longitudinal spin axis of the vortex flow in said vortex chamber, spaced wall members forming a curved annular secondary gas inlet connected to the downstream end of the vortex chamber, swirl vanes in said secondary gas inlet, a discharge conduit coaxial with said housing connected to the vortex chamber at its downstream end, the annular secondary gas inlet surrounding but spaced from the entrance of the discharge conduit, a curved concave guiding wall member positioned between the exit end of the secondary gas inlet and the entrance end of discharge conduit and adapted to smoothly guide the intuming flow from the vortex core into the path of incoming flow from the secondary gas inlet, said discharge conduit being radially flared from its entrance to the exit to form an unrestricted expansion chamber, a clean air discharge conduit, a baffle radially disposed and opposite to the inlet of the discharge conduit between the exit of said expansion chamber and the clean air discharge conduit and serving as an anchor for the other end of the longitudinal spin axis of the vortex flow in the vortex chamber, an annular curved wall forming a curved passage beyond the outer radius of the baffle member and connecting the expansion chamber and the clean air discharge conduit, pressure recovering diffuser vanes in said last-named curved passage, said expansion chamber, said annular curved passage and said diffuser vanes collectively forming a diffuser for recovering the rotational kinetic energy of the vortex flow into said expansion chamber in the form of static pressure and means in the vortex chamber wall positioned between the ends thereof for collecting and discharging particles centrifuged from the vortex flow in the vortex chamber.

4. Apparatus for centrifugally separating suspended particles from a gas stream comprising a cylindrical housing providing an elongated vane free vortex chamber, means providing an annular inlet passage connected to said housing adjacent one end of said vortex chamber, swirl vanes in said annular passage for imparting a rotation to a contaminated gas stream passing through said inlet passage and initiating a vortex flow in said vortex chamber moving downstream from said inlet passage and creating a centrifugal force field tending to cause radial movement outward of particles entrained in the gas stream, a transverse wall member downstream from said inlet passage serving as a closure for the outer end of the vortex chamber and adapted to be contacted by the vortex core to thereby anchor one end of the spin axis thereof, said transverse wall member of the vortex chamber housing being provided with a central secondary air admission port, a cylindrical baffle member within the vortex chamber housing and spaced from the inner end of said secondary air admission port to form a radially extending flow space and swirl vanes positioned radially in said radially extending flow space to impart a swirl to the secondary air flowing into the vortex chamber, a housing providing a radial expansion chamber concentric with the axis of the vortex chamber, an outer transverse wall member forming a closure for said expansion chamber, a trumpet shaped conduit connecting the expansion chamber and the vortex chamber and concentric with the means providing the annular inlet passage and surrounded thereby, the trumpet-shaped conduit having its inlet end in the vortex chamber and gradually radially enlarging to permit free and unrestricted expansion of the clean gas discharge passing upstream in said vortex chamber and the spin axis of the vortex flow being anchored at its other end by contacting the transverse wall of the expansion chamber, a particle receiving channel positioned in the wall of said first-named housing to receive dust particles centrifuged from the vortex flow and carried downstream therewith, and means connected to said channel for removing collected dust particles from said channel to the exterior of the vortex chamber housing.

References Cited

UNITED STATES PATENTS

| | | | |
|---|---|---|---|
| 447,333 | 3/1891 | Kutsche | 55—459 X |
| 2,192,214 | 3/1940 | Weir | 55—456 X |
| 2,193,883 | 3/1940 | Reeves | 55—468 X |
| 2,252,581 | 8/1941 | Saint-Jacques | 55—456 X |
| 2,542,549 | 2/1951 | McBride | 55—447 X |
| 2,622,735 | 12/1952 | Criner | 209—211 |
| 2,846,024 | 8/1958 | Bremi | 55—454 X |
| 2,981,369 | 4/1961 | Yellott et al. | 55—449 X |
| 3,199,270 | 8/1965 | Oehlrich | 55—456 X |
| 3,199,272 | 8/1965 | Oehlrich et al. | 55—448 X |
| 3,212,240 | 10/1965 | Streete | 55—346 |
| 1,798,510 | 3/1931 | Winslow et al. | 55—431 |
| 2,069,483 | 2/1927 | Skajaa | 55—348 |
| 2,806,551 | 9/1957 | Heinrich | 55—348 |

FOREIGN PATENTS

| | | |
|---|---|---|
| 202,987 | 4/1959 | Austria. |
| 1,101,451 | 4/1955 | France. |
| 22,245 | 2/1909 | Great Britain. |
| 35606 | 6/1935 | Netherlands. |
| 933,936 | 8/1963 | Great Britain. |

FRANK W. LUTTER, Primary Examiner

B. NOZICK, Assistant Examiner

U.S. Cl. X.R.

55—347, 348, 416, 449, 457, 468